P. J. H. BERNARD.
ELECTRIC HEATING ELEMENT.
APPLICATION FILED DEC. 9, 1920.
1,407,918.
Patented Feb. 28, 1922.
3 SHEETS—SHEET 3.
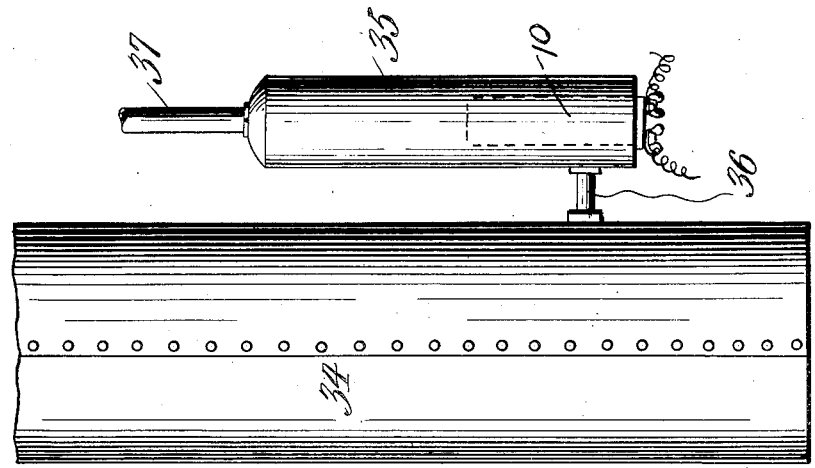
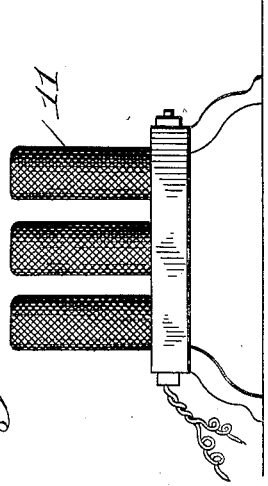
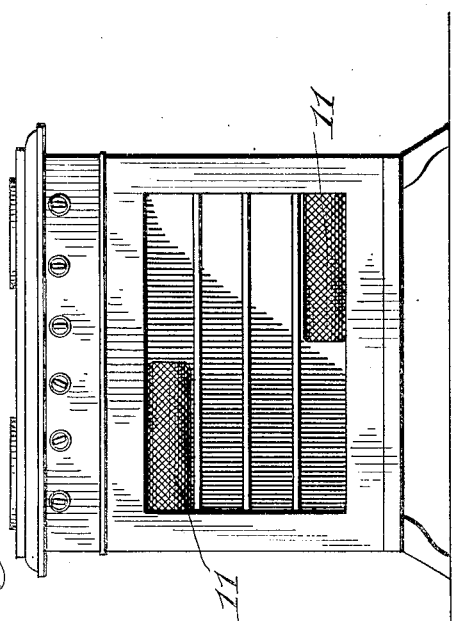
Inventor
Pierre J. H. Bernard
By William C. Sinton
Attorney

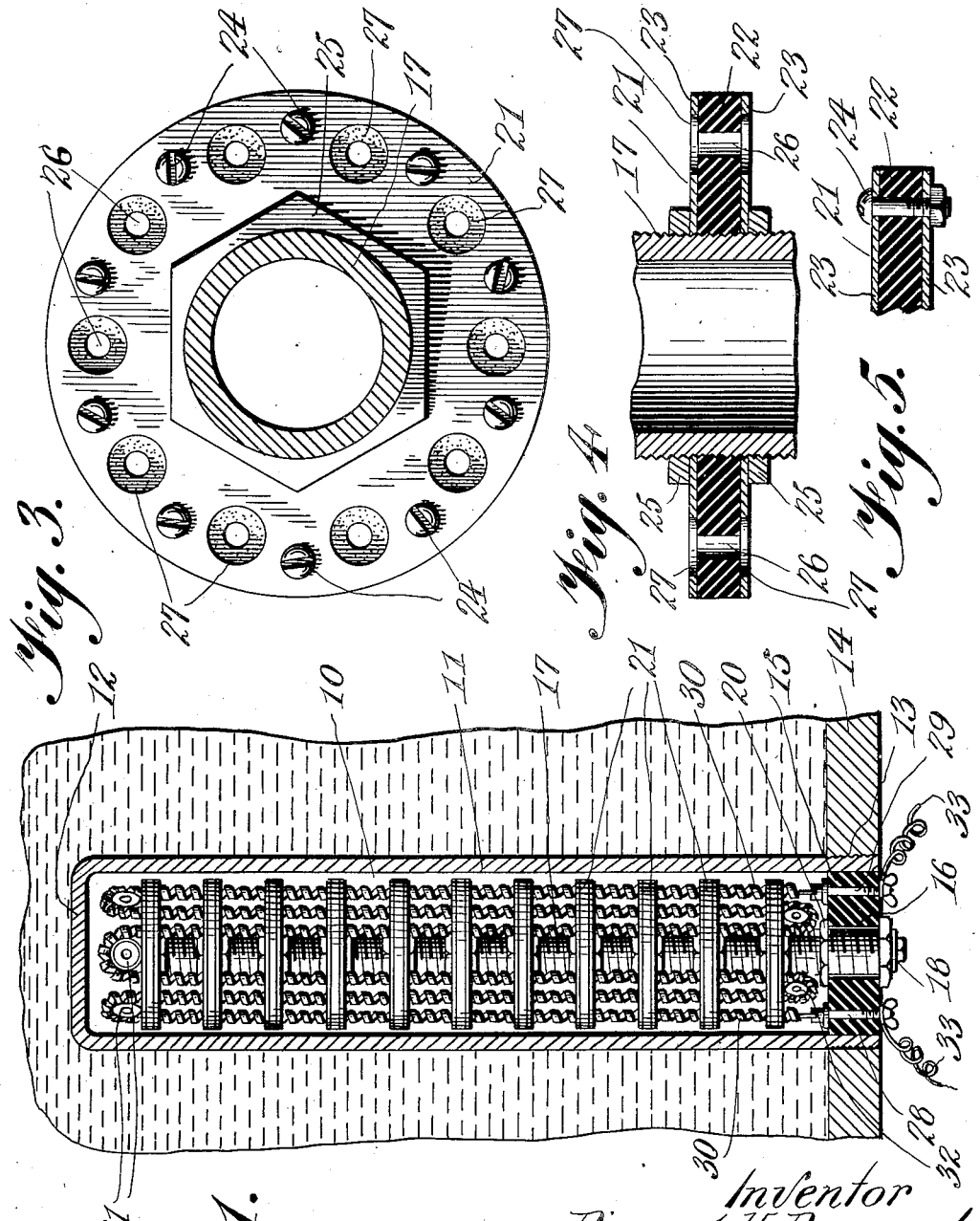

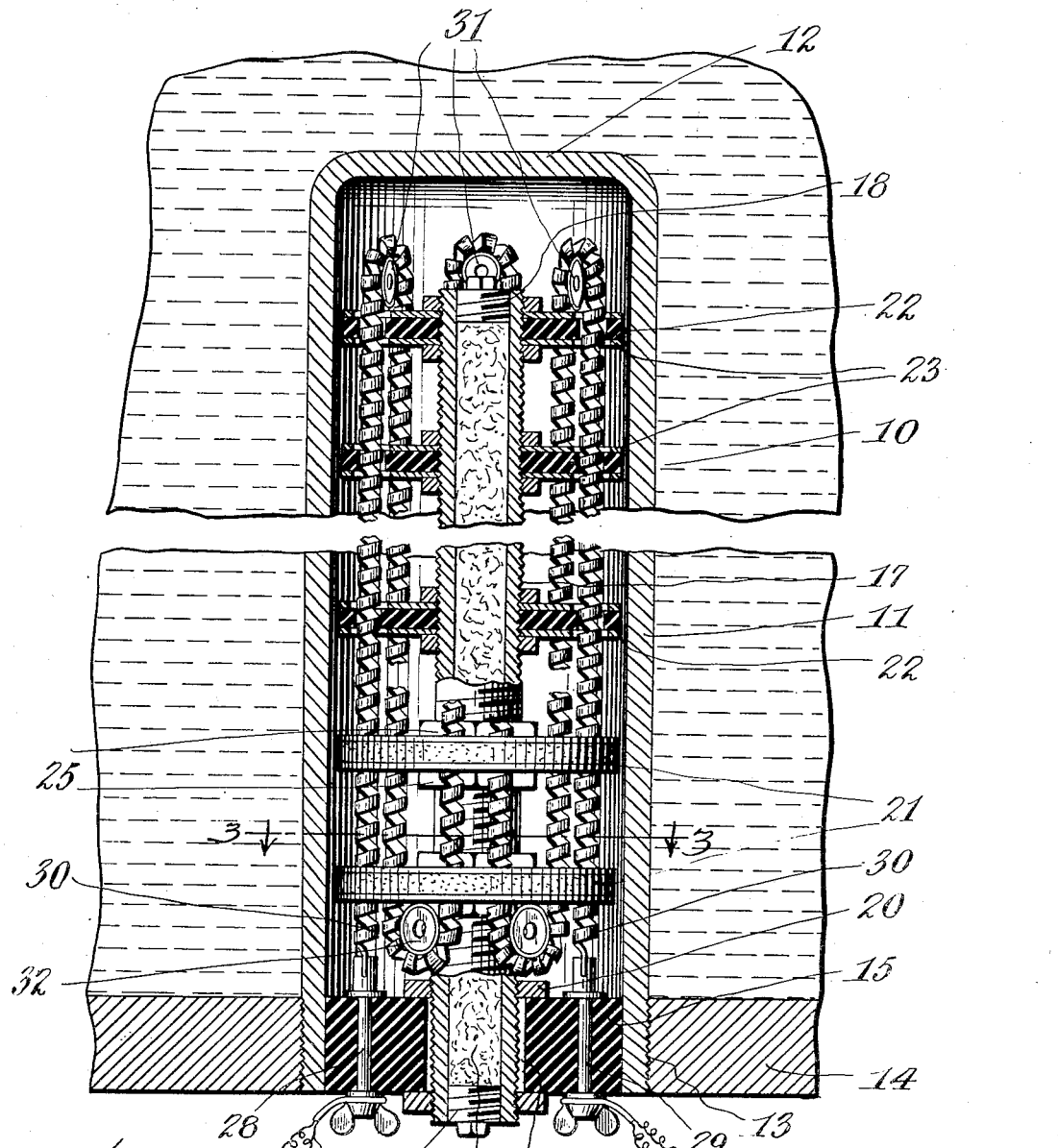

UNITED STATES PATENT OFFICE.

PIERRE JOSEPH HENRI BERNARD, OF MONTREAL, QUEBEC, CANADA.

ELECTRIC HEATING ELEMENT.

1,407,918.  Specification of Letters Patent.  Patented Feb. 28, 1922.

Application filed December 9, 1920. Serial No. 429,452.

*To all whom it may concern:*

Be it known that I, PIERRE JOSEPH HENRI BERNARD, a subject of the King of Great Britain, residing at Montreal, Province of Quebec, Canada, have invented certain new and useful Improvements in Electric Heating Elements; and I do hereby declare that the following is a full, clear, and exact description of the invention, such as will enable others skilled in the art to which it appertains to make and use the same.

The present invention relates to new and useful improvements in an electric heating element.

The primary object of the invention is the provision of an electric heating element which may be used for various purposes and which is designed to give a maximum supply of heat.

Another object of the invention is the provision of an electric heating element so designed that the same may be used for various purposes and so arranged that the life of the same will be greatly prolonged over corresponding heaters now in use.

A further object of the invention is the provision of a heating element such as above referred to, which is electrically operated and so arranged that the same can be either immersed in water if desired or used for any other purpose to which the various parts thereof will adapt themselves, the same being provided with means for supporting the resistance elements in such manner that the expansion of the materials caused by the heating of the element will not serve to break any of the said resistance elements.

A still further object of the invention is the provision of a heating element such as above referred to, which will be comparatively simple and inexpensive to manufacture, reliable and efficient in use and readily operated.

With the above and other objects in view, the present invention resides in the novel features of construction, formations, combinations and arrangements of parts to be hereinafter more fully described, claimed, and illustrated in the accompanying drawings forming a part of the present application, and in which:

Figure 1 is a vertical sectional view taken through the invention;

Figure 2 is a similar view on a greatly enlarged scale with parts broken away;

Figure 3 is a horizontal sectional view taken on the line 3—3 of Figure 2;

Figure 4 is a detail sectional view illustrating the means of supporting one of the spacing disks and the construction thereof;

Figure 5 is a detail sectional view taken through the edge of one of the said supporting disks;

Figure 6 is a view showing the application of the elements to an ordinary form of heater;

Figure 7 is a view showing the application to an ordinary electric cooking stove; and, Figure 8 is a view illustrating the application of the device to an ordinary form of boiler.

Referring now to the accompanying drawings by corresponding characters of reference throughout the several views, the numeral 10 designates in general my improved heating element which comprises a casing 11 closed at 12 at its upper end and having threaded engagement as at 13 at its lower end into a suitable base or support 14.

The lower end of the casing 11 is closed by an insulating block 15 which is forced into the lower end of the casing 11 and held therein by frictional engagement.

The block 15 is provided with a central opening 16 through which passes a vertically threaded tube 17, the opposite ends of which are closed by the removable plugs 18 to retain the asbestos packing 19 within said tube.

Suitable lock nuts 20 are threaded upon the lower end of the tube 17 and by their engagement with the opposite sides of the insulating plug 15 retain the tube 17 firmly in the position shown in Figure 2, concentric of the casing 11.

A plurality of spacing disks 21 are positioned upon the tube 17 and each comprises an insulating disk 22 engaged at its opposite sides by the thin metallic plates 23. The plates 23 are clamped to the disk 22 by the bolts 24 which extend around the upper edges of the same, while the latter is clamped upon the tube 17 by the nuts 25, as clearly shown in Figure 4 of the drawings.

The insulating disk 22 is provided with openings 26 while aligning openings 27 are provided in the plates 23. The openings 27 are of greater diameter than the openings 26 for a purpose to be later explained.

Binding posts 28 and 29 extend through the block 15 and have connected to their upper ends the opposite terminals of a resistance element 30. The element 30 is first attached to the binding post 28, then passes upwardly through the openings 26 formed in the spacing disks 21 being held out of engagement with the plates 23 by virtue of the openings 26 being of less diameter than the openings 27, and the diameter of the resistance wires being substantially equal to that of the openings 26.

The element 30 passes upwardly through the upper disk and over the pulleys 31, then downwardly through the disks and over the pulleys 32 positioned below the lower disk 21, finally terminating at the binding post 29 to which it is connected.

If desired, a plurality of resistance elements 30 may be used and likewise a plurality of binding posts 28 and 29.

The conductors 33 are likewise attached to the binding posts 28 and 29 to supply current to the said heating element.

From the foregoing description taken in connection with the accompanying drawings, it will be manifest that an electric heating element is provided, which will fulfil all of the necessary requirements of such a device and which can be used for various purposes such as an ordinary heater shown in Figure 6, the usual cook stove shown in Figure 7, or the device for heating water in an ordinary boiler shown in Figure 8.

In Figure 6 the elements may be arranged in plurality, and the casings 11 formed from suitable reticulate material. This is also true of the form disclosed in Figure 7, while in Figure 8 a boiler is shown at 34 and connected thereto is a casing 35 which has its connection with the said boiler 34 through the pipes 36 and 37 which lead from the opposite ends thereof.

The heating element 10 is positioned within the casing 35 and the water passing from the boiler into said casing surrounds the element 10, and being heated, passes back into the said boiler.

In the accompanying drawings has been shown a simple and preferred form of the invention, it being, however, understood in this connection that various minor changes in the specific details of construction can be resorted to within the scope of the appended claims, without departing from the spirit or sacrificing any of the advantages of the invention.

Having thus fully described the invention what I claim as new and desire to protect by Letters Patent is:—

1. A resistance element such as described, including an insulating block, a tubular member attached thereto and extending therefrom, asbestos packing within said tubular member, spacing disks mounted upon the tubular member, binding posts carried by the insulating block, pulleys mounted upon opposite sides of the end spacing disks, and a resistance element attached to the binding posts and passing through openings provided in the disks and over said pulleys, substantially as and for the purposes set forth.

2. In a heating element such as described, the combination of a casing, an insulating block inserted in one end thereof, binding posts passing through the insulating block, a tubular member carried by the insulating block and extending through the casing, asbestos packing within the tubular member, spacing disks each including insulating disks and plates clamped to the opposite sides thereof mounted upon the tubular member, said spacing disks having openings provided therein, insulating pulleys mounted upon certain of said disks, and a resistance element attached to the binding posts and passing upwardly and downwardly through the openings formed in the disks and over said pulleys, substantially as and for the purposes set forth.

3. In a heating element such as described, the combination of a casing, an insulating block inserted at one end thereof, a tubular threaded member carried by said block and extending into said casing, asbestos packing contained within said tubular member, plugs threaded in each end of the tubular member to retain the asbestos therein, spacing disks equidistantly mounted upon the tubular member, each disk having a plate clamped to the opposite sides thereof and having openings provided therein, insulating pulleys mounted on the upper and lower disks, a resistance element passing upwardly and downwardly through the openings in the disks and over said pulleys and binding posts carried by the insulating block, said binding posts having attached thereto the said resistance element substantially as and for the purposes set forth.

4. A heating element such as described, including a casing having a lower threaded portion for engagement into a base or support, an insulating block carried at the lower inner end of said casing, binding posts secured to said block, a tube threaded throughout its length and secured at one end to said insulator block by lock nuts, said tube extending from said block into said casing, disks carried by said tube in spaced relation and secured thereto by lock nuts, plates clamped on opposite sides of said disks, openings formed in said disks and plates, insulator pulleys carried by the upper and lower disks, and a resistance element attached to said binding posts and passing upwardly and downwardly through said openings and over said pulleys substantially as and for the purpose specified.

In witness whereof I have hereunto set my hand.

PIERRE JOSEPH HENRI BERNARD.